(12) United States Patent
Knas et al.

(10) Patent No.: US 10,306,582 B1
(45) Date of Patent: *May 28, 2019

(54) BEACON-BASED LOCATION INTRODUCTION SYSTEM

(71) Applicant: MASSACHUSETTS MUTAL LIFE INSURANCE COMPANY, Springfield, MA (US)

(72) Inventors: Michal Knas, Monson, MA (US); Jiby John, Suffield, CT (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/872,104

(22) Filed: Jan. 16, 2018

Related U.S. Application Data

(63) Continuation of application No. 15/466,579, filed on Mar. 22, 2017, now Pat. No. 9,877,298.

(60) Provisional application No. 62/311,668, filed on Mar. 22, 2016.

(51) Int. Cl.
| | |
|---|---|
| *H04W 64/00* | (2009.01) |
| *H04L 29/08* | (2006.01) |
| *H04W 40/24* | (2009.01) |
| *H04W 8/00* | (2009.01) |
| *H04W 4/021* | (2018.01) |

(52) U.S. Cl.
CPC ........... *H04W 64/00* (2013.01); *H04L 67/303* (2013.01); *H04W 4/021* (2013.01); *H04W 8/005* (2013.01); *H04W 40/244* (2013.01)

(58) Field of Classification Search
CPC ....... H04W 4/02; H04W 4/023; H04W 4/025; H04W 4/008; H04W 4/026; H04W 4/027; H04W 4/028; H04W 4/22; H04W 64/003; H04W 4/021; H04W 4/206; H04W 88/08; H04W 48/16; H04W 88/02; H04W 40/244; H04W 8/005
See application file for complete search history.

(56) References Cited

U.S. PATENT DOCUMENTS

| | | | |
|---|---|---|---|
| 9,154,451 B2 * | 10/2015 | Chernoff | ................ H04L 49/70 |
| 9,392,406 B2 | 7/2016 | Houri | |
| 9,578,596 B1 | 2/2017 | Rodoper et al. | |
| 9,877,298 B1 | 1/2018 | Knas et al. | |
| 2003/0013456 A1 * | 1/2003 | Bates | ..................... H04W 4/02 |
| | | | 455/456.1 |
| 2010/0004005 A1 | 1/2010 | Pereira et al. | |

(Continued)

*Primary Examiner* — Jean A Gelin
(74) *Attorney, Agent, or Firm* — Eric L. Sophir; Dentons US LLP

(57) ABSTRACT

Embodiments of the present disclosure include an efficient method for identifying receiving devices with similar attributes and displaying their respective locations to each other using data packets receiving from transmission associated with beacons. The system can receive unique beacon identifiers from a first receiving device, determine its location, receive a request for a match comprising a set of attributes, query a database and identify a second user associated with a second receiving device based on the received set of attributes, determine a location for the second receiving device, and generate/transmit a graphical user interface to the first receiving device informing the first user about the location of the second user.

20 Claims, 4 Drawing Sheets

(56) References Cited

U.S. PATENT DOCUMENTS

| | | | |
|---|---|---|---|
| 2013/0090130 A1* | 4/2013 | Burrell | H04W 64/00 455/456.1 |
| 2013/0091452 A1* | 4/2013 | Sorden | G06F 3/048 715/771 |
| 2014/0152421 A1* | 6/2014 | Cazanas | G07C 9/00309 340/5.32 |
| 2015/0141061 A1 | 5/2015 | Anantharaman | |
| 2015/0200981 A1* | 7/2015 | Garrick | H04L 43/10 709/204 |
| 2015/0234832 A1* | 8/2015 | Gardner, III | G06F 17/3053 707/749 |
| 2015/0264531 A1* | 9/2015 | Kim | H04W 4/12 455/414.3 |
| 2016/0013856 A1 | 1/2016 | Kikuchi | |
| 2017/0006162 A1* | 1/2017 | Bargetzi | H04N 7/147 |
| 2017/0018184 A1 | 1/2017 | Northrup et al. | |
| 2017/0131884 A1 | 5/2017 | Jeon et al. | |
| 2017/0295461 A1 | 10/2017 | Smith et al. | |
| 2017/0311367 A1* | 10/2017 | Ursitti | H04W 4/023 |

* cited by examiner

BEACON-BASED LOCATION INTRODUCTION SYSTEM

CROSS REFERENCE TO RELATED APPLICATION

This patent application is a continuation of U.S. patent application Ser. No. 15/466,579, filed on Mar. 22, 2017, which claims priority to U.S. Provisional Patent Application Ser. No. 62/311,668, filed on Mar. 22, 2016, each of which is fully incorporated by reference in their entirety.

This application is related to U.S. patent application Ser. No. 15/466,542, filed Mar. 22, 2017, which is incorporated by reference in their entirety.

TECHNICAL FIELD

The present application relates generally to systems, methods, and other embodiments associated with data transmittal between a beacon and a mobile device.

BACKGROUND

Large buildings, such as office campuses, can be disorienting and confusing to navigate. This problem is particularly acute when many buildings and floors look the same, which can be troublesome for clients/employees unfamiliar with the building(s). Current methods of locating or tracking people are manual and cumbersome. Currently, people must train each other to navigate new spaces, which has proven inefficient for many institutions with new employee or employees working from different office locations. Many new employees, unfamiliar with the buildings and other employees, may not be able to find other like-minded employees. In some cases, even if the new employees find another like-minded employee, they may not be able to find them.

SUMMARY

For the aforementioned reasons, there is a need for better indoor positioning systems. There is a need for an efficient and accurate computer system and method to manage indoor navigation, automatically find interested individuals based on their mobile devices, and generate notifications to guide employees towards other targeted individuals within the building. The systems and methods disclosed herein attempt to address the above-mentioned shortcomings in the art and provide a variety of other benefits. The systems and methods described herein can create, maintain, transmit, and utilize data from receiving devices and beacons. The systems and methods disclosed herein attempt to address the shortcomings in the art and provide a variety of other benefits. The systems and methods described herein can create, maintain, and transmit information about an interested user and provide a location based guidance as to where the interested user is located.

In an embodiment a method comprises receiving, by a server, a first device identifier and first location information from a first receiving device, the first location information being associated with a first location of the first receiving device received from one or more beacons, wherein the first device identifier comprises a distinctive combination of at least one of numbers and characters uniquely identifying the first receiving device; determining, by the server, a location associated with the first receiving device based at least on one of the first location information and the first device identifier; receiving, by the server, a request to find a second device identifier, wherein the request comprises a set of attributes associated with the second receiving device; determining, by the server, a time value associated with the second receiving device, wherein the time value corresponds to the time that the second receiving device will remain in the location associated with the second receiving device; querying, by the server, a database to identify the second receiving device responsive to the set of attributes received from the first receiving device, wherein the database is configured to store one or more records of the set of attributes associated with one or more records of a plurality of receiving devices including the first and the second receiving devices, wherein the time value associated with the second receiving device satisfies a threshold; receiving, by a server, a second device identifier and second location information from the second receiving device, the second location information being associated with a second location associated with the second receiving device received from one or more beacons, wherein the second device identifier comprises a distinctive combination of at least one of numbers and characters uniquely identifying the second receiving device; determining, by the server, a location associated with the second receiving device based at least on one of the second location information and the second device identifier; determining, by the server, a path associated with the first receiving device, wherein the path corresponds to the location associated with the first receiving device in relation to the second receiving device; transmitting, by the server, the path to the second receiving device.

In another embodiment a server configured to receive a first device identifier and first location information from a first receiving device, the first location information being associated with a first location of the first receiving device received from one or more beacons, wherein the first device identifier comprises a distinctive combination of at least one of numbers and characters uniquely identifying the first receiving device; determine a location associated with the first receiving device based at least on one of the first location information and the first device identifier; receive a request to find a second device identifier, wherein the request comprises a set of attributes associated with the second receiving device; receive a second device identifier and second location information from the second receiving device, the second location information being associated with a second location associated with the second receiving device received from one or more beacons, wherein the second device identifier comprises a distinctive combination of at least one of numbers and characters uniquely identifying the second receiving device; determine a location associated with the second receiving device based at least on one of the second location information and the second device identifier; determine a time value associated with the second receiving device, wherein the time value corresponds to the time that the second receiving device will remain in the location associated with the second receiving device; query a database to identify the second receiving device responsive to the set of attributes received from the first receiving device, wherein the database is configured to store one or more records of the set of attributes associated with one or more records of a plurality of receiving devices including the first and the second receiving devices, wherein the time value associated with the second receiving device satisfies a threshold; determine a path associated with the first receiving device, wherein the path corresponds to the location associated with the first receiving device in relation to the second receiving device; and transmit the path to the second receiving device.

A beacon is small, battery-friendly device that sends out a low-voltage signal, such as Bluetooth Low-Energy (BLE), for a programmable distance between about a few cm to 40-50 m. In addition, some smartphones can act as beacons. The frequency of sending the signal can also be programmable; for example, a signal can be sent every 100-400 milliseconds. Beacons can be placed strategically indoors or outdoors to perform many actions.

Beacons can transmit small packets of data or advertisement data packets. Here the term "Beacon" applies to any device, mobile or fixed, that is capable of transmitting an advertisement data packet. An advertisement data packet can be the same as defined in the Bluetooth specification or any other data packet that transmits a unique identifier. Currently, beacons repeatedly transmit advertisement data packets in set intervals. The iBeacon system (implemented by Apple®) utilizes iBeacons (a form of beacon) to transmit an advertisement data packet consisting mainly of three pieces of information—a Universally Unique Identifier (UUID), a major field, and a minor field. And an iBeacon typically transmits that packet over and over again. Further information about beacons can be found in the Supplement to the Bluetooth Core Specification, Version 5, which is incorporated by reference herein.

In one use case, retailers use these beacons or transmitters as a hyper-local device tracking mechanism, i.e., to locate smartphones within the proximity. Non-limiting examples of transmitters include an iBeacon, AltBeacon, and EddyStone, a wireless router, a cellular phone, a tablet, a workstation, or any other suitable computing or other electronic device. Location-based information is provided to a consumer's personal device based on its receipt a packet from a beacon. One or more mobile applications on receiving devices can use the advertisement data packet to assess current location or other information. For instance, the one or more applications can transmit information, such as a UUID, contained in the advertising data packet, to a server to retrieve information associated with the advertising data packet. These advertising data packets also allow for delivery of specific content to users based on location. For example, an iBeacon located in aisle 3 of a personal goods store transmits its UUID to consumers' mobile devices. If a consumer has a smartphone that contains the application for the personal goods store, then the store can transmit special offers for products sold in aisle 3. The UUID portion of the advertising data packet is associated with the personal goods store while the major and minor field identifies specific section and aisle of the personal goods store. The iBeacon devices are little power-efficient sensor-like devices that do not receive anything, but transmit an identity in a given proximity, about a 30-foot range.

Additional information can be gleaned from BLE signals, including an approximate distance between the beacon and the receiving device. Beacons can be programmed to broadcast their signals at different power levels, known as the "Broadcasting Power." The BLE beacon can transmit its Broadcasting Power to the receiving device, which can approximate its distance from the beacon by comparing the Broadcasting Power to the strength of the signal as received, known as the Received Signal Strength Indicator (RSSI).

The term "beacon" as used herein refers to any device configured to transmit a data packet, which is used by a receiving device to identify the transmitting device and compute the relative distance between the transmitting device and the receiving device. Beacons can be physical devices or virtual beacons. Beacons transmit small packets of data. Currently, beacons repeatedly transmit data packets in set intervals. There are several types of beacons and associated protocols available in the market such as iBeacon system (implemented by Apple®), AltBeacon (provided by Radius Networks), and EddyStone® (from Google®). The iBeacons and AltBeacons broadcast a data packet consisting mainly of following pieces of information—a Universally Unique Identifier (UUID), a major number, a minor number, and a transmission power level known as the "Broadcasting Power." These formats require external databases to give meaning to the beacon data packets. Receiving devices can approximate distance from the beacon by comparing the Broadcasting Power to the strength of the signal as received, known as the Received Signal Strength Indicator (RSSI). As these devices typically transmit that packet over and over again, this type of transmission defines the advertising functionality of beacons. These data packets are recognized only by special apps on the mobile phone of the users. Beacons supporting the Eddystone format broadcast three different packets: a unique ID number, a URL address, and telemetrics based on sensors. They don't require an external database; instead they use web links to either link to data directly and could function via a two-way communication method. The Eddystone-URL frame type broadcasts information that can be used by a phone even without a specialized application. Virtual beacons may not require specialized devices and may use existing indoor positioning systems and the user devices to deliver location-based information. Beacons can be configured to broadcast sensor data such as temperature and battery level, or even data gathered from other sensors in the room such as motion-detectors. Some embodiments can use RSSI or triangulation to assess more accurately the location of a receiving device. For instance, the receiving device may receive signals from more than once source or of more than one type, e.g., Wi-Fi, BLE, and GPS. By relying on more than once source, these embodiments are more reliable and more accurate.

One problem with current beacon technology is that they are single use, and therefore do not present accurate granular location information. Embodiments of the present invention solve this problem by allowing one or a plurality of beacons to transmit information at different ranges to provide more granular location information.

Additional features and advantages of an embodiment will be set forth in the description which follows, and in part will be apparent from the description. The objectives and other advantages will be realized and attained by the structure particularly pointed out in the exemplary embodiments in the written description and claims hereof as well as the appended drawings. It is to be understood that both the foregoing general description and the following detailed description are exemplary and explanatory, and are intended to provide further explanation of embodiments as claimed.

BRIEF DESCRIPTION OF THE DRAWINGS

The accompanying drawings constitute a part of this specification and illustrate some embodiments.

DETAILED DESCRIPTION

Reference will now be made in detail to the preferred embodiments, examples of which are illustrated in the accompanying drawings. The embodiments described herein are intended to be exemplary. One skilled in the art recognizes that numerous alternative components and embodiments may be substituted for the particular examples described herein and still fall within the scope of the invention.

Figure 1:
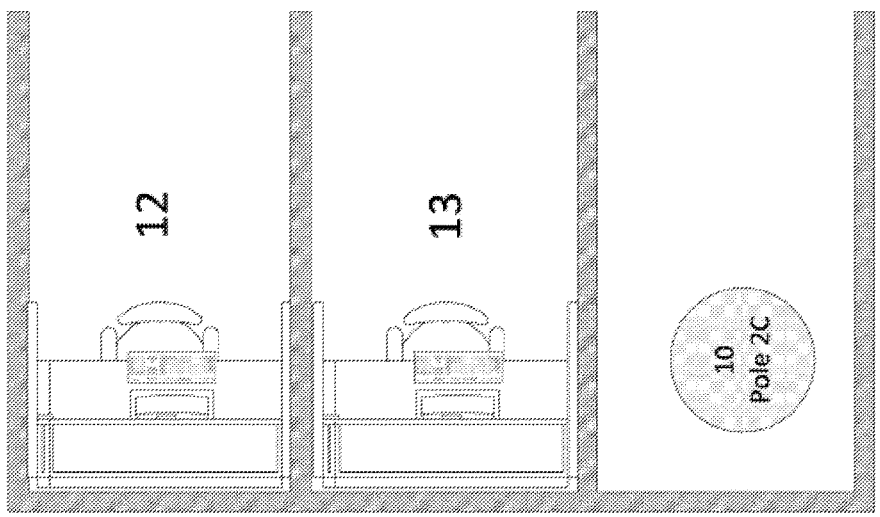
FIG. 1 illustrates an embodiment of beacon transmitters included in an office building.

FIG. 1 illustrates a block diagram of a section of a building according to one embodiment. The hallway 11 is adjacent to transmitter 10, which is affixed to pole 2C. Pole 2C can be a support pole. Other embodiments include affixing transmitter 10 to a wall or the ceiling (not shown), or anywhere else it may be convenient to locate transmitter 10. Two cubicles are near pole 2C and can have an address of 2C, and hence have an address that includes 2C, and perhaps a floor number if the building has multiple floors, and a building number if there are multiple buildings on the campus. Transmitter 10 can broadcast data packets any supported distance. For example, transmitter 10 can broadcast data packets a distance sufficient to extend across hallway 11, which would ensure that users who walk through hallway 11 can receive a data packet. FIG. 1 also illustrates cubicles 12 and 13 that are associated with pole 2C. It is common in large buildings and building complexes to associate locations with poles on floors to make it easy to find specific locations within large areas. Cubicles 12 are only for illustrative purposes. Embodiments include other large spaces, such as warehouses, docks, exhibition halls, stadiums, and amusement parks. In some embodiments, a map associated with all the above-mentioned locations are stored in the location management database and retrievable upon instructions/command of an analytical server (described in FIG. 4).

Figure 2:
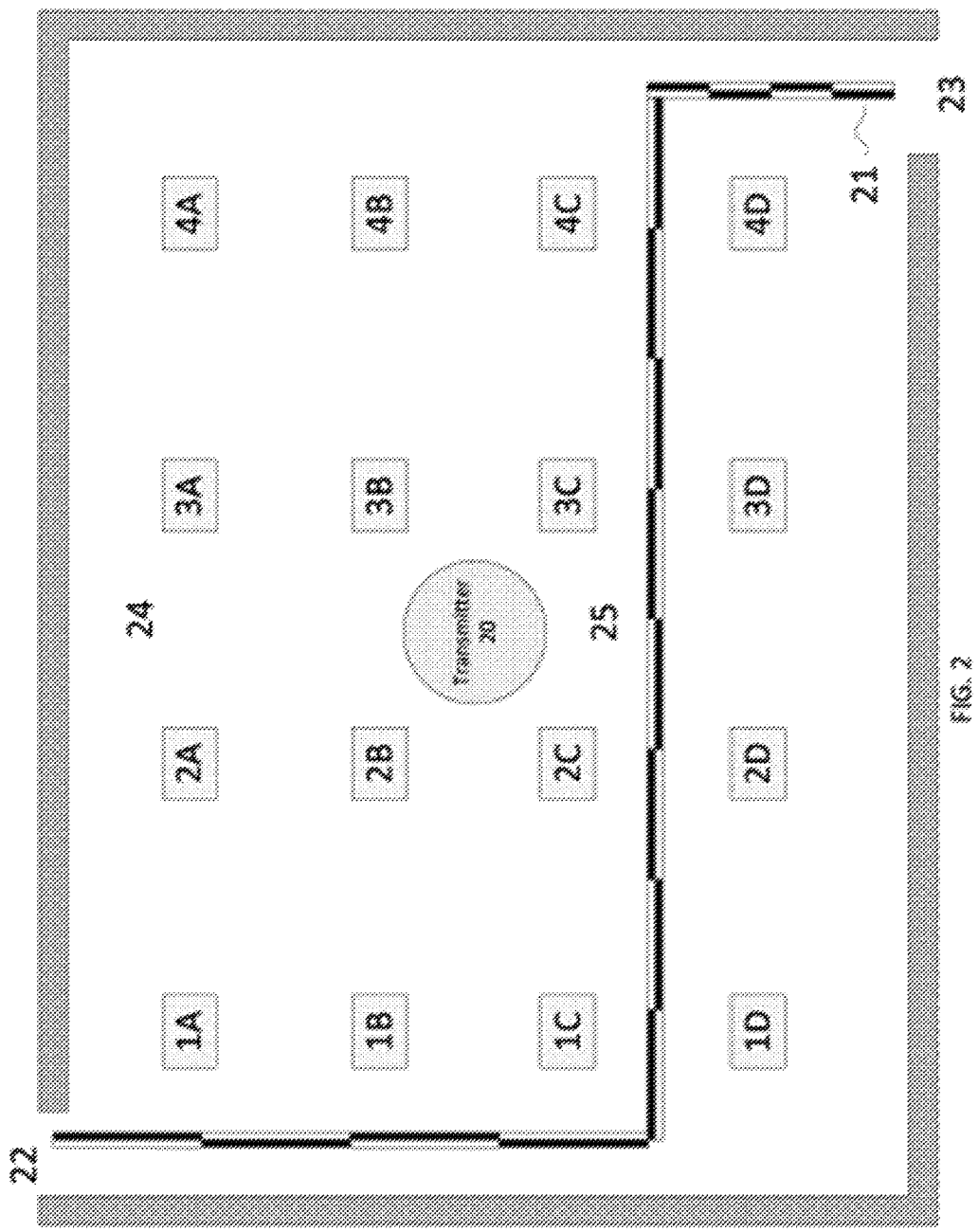
FIG. 2 illustrates an embodiment having a grid of poles on the floor of a building.

FIG. 2 illustrates a building having a four-by-four grid of poles 1A-4D. As stated above, this space can be occupied for any number of uses, including the cubicle use illustrated by FIG. 1. FIG. 2 further illustrates a transmitter located near the center of the building. These transmitters can be configured to transmit its unique identifier across the entire space. This embodiment can work in cooperation with or exclusive to a more granular embodiment in which transmitters do not broadcast over entire floors. Specifically, in the example of FIG. 1, transmitter 10 broadcasts data packets a distant sufficient to extend across hallway 11, but not so far as to cover other hallways, so that the analytical server can identify more accurately where the receiving device is located. If transmitter 20 works in cooperation with one or more transmitters 10, attached to one or more of poles 1A-4D, the analytical server can identify the location of a receiving device with more granularity. If the receiving device receives no data packets from transmitters other than transmitter 20, then the analytical server can only identify that the receiving device was located in the room of FIG. 2, but not exactly where in the room the receiving device was located.

If the receiving device only receives data packets from transmitter 20, then the analytical server (explained below) can determine the receiving device's location. For instance, in some embodiments, if the receiving device was previously in a room adjacent to the room in FIG. 2, then the analytical server can determine that the receiving device went through the entrance 22, upon entering the room 24. The analytical server may query a database in order to receive a map associated with the current location of the receiving device (e.g., based on the received identifiers, the analytical server may detect which map to query) and determine the overall layout of the building and the location of the receiving device in relation to the transmitting beacon. Further, the analytical server may be able to extrapolate how far the user was from the transmitter at different times by using the RSSI functionality in BLE. In the example in which the receiving device is determined to have entered via entrance 22, the analytical server could also have detected that the receiving device exited via exit 23 because the receiving device received another data packet in the room connected to room 24 via exit 23. Therefore, the analytical server can determine that the receiving device moved from entrance 22 to exit 23. The analytical server can also determine what path the receiving device took to get from entrance 22 to exit 23 by using the RSSI distance information. If the distance between path 21 and transmitter 20 is equal to the closest equivalent to the point 25, then the analytical server can determine that the receiving device passed within that distance from transmitter 20. The analytical server can also extrapolate the speed at which the receiving device was travelling. This can be determined based on the normal speed at which the receiving device moves, or based on prior samples of the speed at which the receiving device moved. The analytical server can average those prior samples to determine an average speed of the receiving device. Using the start location, end location, distance from the transmitter, and average speed of the receiving device, the analytical server can determine a best option as to the path the receiving device took, absent better information. In the alternative, the analytical server can generate a path that is best for that user, e.g., the fastest path, one past restrooms or a water fountain, or a path past known stops associated with the receiving device, such as a colleagues' cubicle. The analytical server may generate the path or query existing paths from a database associated with the floor map. The analytical server may also display the path on the user device (e.g., mobile device or other electronic device). The analytical server may display a path 21 similar to that illustrated in FIG. 2. The analytical server could display the entire path through each building, or display a path on a room-by-room basis. Other embodiments could also include directions to go past the poles that the receiving device passed by. In the example of FIG. 2, those poles could be 1A, 1B, 1C, 2C, 3C, 4C, and 4D.

In certain embodiments, the transmitters 10 and 20 transmit the data strings in their characteristic pattern. A nearby receiving device receives these data strings and once a sufficient number of data strings have been collected, the receiving device communicates with the network server regarding the data strings. When the network server receives the information from the receiving device, the server processes the information to verify the authenticity of the information received by the receiving device or the integrity of the information received by the receiving device or both. Once verified, the receiving device receives knowledge of said verification. If the verification process fails, the network server can be designed to notify an administrator that flags the beacon or the transmission for the beacon. In certain embodiments, other security processes can be initiated to deal with the failure in the verification of the information.

Instead of pole numbers, embodiments can use office numbers, where the first number of the office number signifies the floor that the office is on. Alternatively, the first number could be the building number, and the second number could be the floor number. In any case, the location of a particular cubicle or office can be associated with a computer-readable identifier, e.g., a memory address, such that the system can look up the location of such an office or cubical by hashing the computer-readable identifier or going to a memory address to retrieve the office or cubicle location. Similarly, if someone moves offices, the system can be reprogrammed by modifying who exits at a particular location. In addition to poles having transmitters attached to them, individual offices and conference rooms can have one or more transmitters in them to ensure there is coverage throughout a building.

Embodiments can also automatically update user profile information with unique identifiers associated with locations where the user is most often located. For example, the system can identify that a user now does not visit their old office and instead spends the majority of their days in a different office. The system can then assume that the user has moved to a new office after a predefined number of days, such as 10 days. In another example, if a user is detected to be near a pre-determined area (e.g., a cafeteria) around the same time every day, the user's profile is updated to reflect when the user is presumably eating lunch.

The location information can be presented via uploaded maps, and the location of the user can be presented on the map via, for example, a blue dot. The system can also present the location of other users by, for example, presenting the location of others using their pictures, which can be entered by the users in the system or retrieved from the Internet, including social networks such as LinkedIn®. While the system can present a user's location at all times, the system could alternatively or in addition allow users to search for other user's current location. The system can also allow for navigation on the map, such that a path 21 may appear similar to how it does in FIG. 2.

Another embodiment can be used to locate a person based on the person's mobile device. For instance, if a first user is not in their office, a second user can locate the first user using the disclosed system, and decide whether to contact them or wait for them if they might return soon. Else, the second user could see that the first user had alternative plans or is not at work, and proceed to lunch without them. In addition, certain embodiments allow people to identify new people. For example, a location management system may find new coworkers or others based on their device identifiers. In an embodiment, users can identify in their profiles whether they are interested in going to lunch with others. If so, the system can place the user's name on a list of people available for lunch. The system can verify that such people are in the building, and if they are, others can select them for having lunch. The system can also identify a coworker to spend time with at random. These types of meetings can be highly valuable at companies, as they encourage diverse thinking and a broader institutional knowledge for employees, potentially leading to new ideas and projects that could lead to new products or services for the company. The system can include profile pictures of everyone, which would make it easier for people to identify new coworkers. The system can also direct the parties directly to each other using the navigation feature.

In the alternative to users identifying their availability to meet other users in their profiles, some embodiments allow for real-time changes to participation in a meeting program via a more simple status change. For instance, users can open an application on their receiving devices to identify whether they are participating in the meeting program at any time. Embodiments can also allow input of an expected time to remain in a specific location, so potential friends/coworkers know how long the user will remain in said location. This can be important when a user sits down but has not yet located the friend. The location management system can be configured to only allow matches when a user has a predetermined amount of time, e.g., forty-five minutes, to remain in a specific location. If a person has less than that amount of time, the location management system may make a match. Alternatively, the system can match people up by the amount of time they expect to remain in a specific location because sometimes people may not want to spend a whole hour with a stranger, and a shorter period would be more acceptable. Above-mentioned embodiments are described in detail in FIG. 3.

Figure 4:
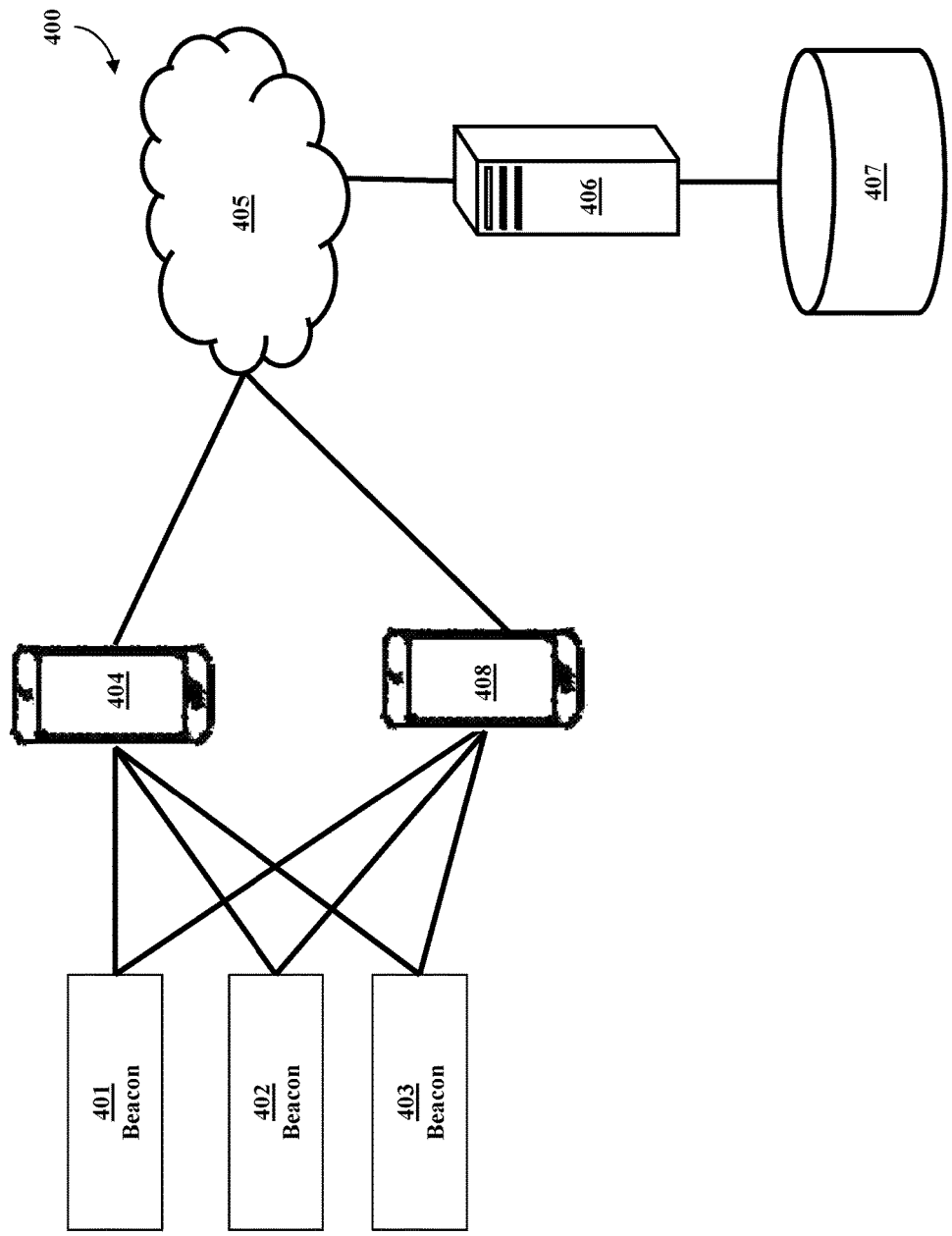
FIG. 4 is a block diagram illustrating a location management system containing an analytical server, according to an embodiment.

Certain embodiments include a system for communicating information between a location management database, a receiving device, one or more beacons, and an analytical server. FIG. 4 is a block diagram illustrating a system 400 containing analytical server 406, according to an embodiment. A plurality of beacons, for example 401, 402, and 403 transmit a plurality of location signals that are received by a receiving device 404 and receiving device 408. The receiving devices 404 and 408 then transmit a device identifier and the plurality of location signals from the plurality of beacons 401, 402, and 403 via a network 405 to one or more servers constituting the analytical server 406. The system 400 also includes a location management database 407 hosted by or communicatively coupled to the analytical server 406. The location management database 407 is configured to store one or more records of a plurality of identifiers, unique device identifiers, individual location information and profiles, individual location notification preferences, maps associated with different buildings, and the like.

The receiving devices 404 and/or 408 can be any mobile location-aware computing devices, e.g., wearable, smartphone or tablets that can receive a wireless signal from one or more transmitters of location signals. When the receiving devices 404 and/or 408 receive the location signals, they may process it using one or more mobile applications in communication with one or more servers constituting the analytical server 406. In some embodiments, the UUIDs or unique identifiers of the beacons 401, 402, and 403 must be programmed and associated with particular locations where they are installed. The beacons 401, 402, and 403 continuously broadcast information, for example in the form of data strings, at a predetermined interval, like a heartbeat of data broadcasts, which are then captured by one or more applications on the receiving devices. The data fields in these broadcasted data strings could include an identifier of an individual beacon, location of the beacon in the office space, time of day, and any information designed for consumption by the receiving devices 404 and/or 408. The receiving devices 404 and/or 408 may be, for example, any mobile computing device with one or more web browsers or other specific applications. It should be appreciated that the software modules described herein may be distributed among the devices of the system 400 in varying permutations. A receiving device, as is known in the art, can be a circuit comprising an antenna for receiving a signal and additional circuitry for demodulating the signal into a digital form capable of being understood by the receiving device. Once demodulated, other circuitry, including a processor, can decode and process information in the signal received by the antenna The analytical server 406 may be any computing device, including one or more servers, comprising non-transitory machine-readable storage media, processors, and software modules capable of performing various tasks and processes described herein. In an embodiment, an application can be downloaded to a receiving device that is able to communicate with the server. The application can be created and maintained by same party who maintains the analytical server 406. In certain embodiments, component features of the server may reside on separate physical devices. The analytical server may be any computing device comprising non-transitory machine-readable storage media, processors, and software modules capable of performing various tasks and processes described herein. In an embodiment, an application can be downloaded to a receiving device that is able to communicate with the server. The application can be created and maintained by same party whom maintains the parking lot. The server may be communicatively coupled over a network to one or more software modules and devices, including transmitters 10 and 20 (FIG. 1) and the receiving devices 404 and/or 408. In certain embodiments, component features of the analytical server 406 may reside on separate physical devices.

The location management database 407 is a body of information associated with the location of the beacons, locations of the user, user preferences, and the like organized as records. This database can comprise information regarding individual consumers/clients and users such as available receiving devices, profiles, preferences, location history from a particular receiving device, and the like. Information in these databases can be stored or retrieved dynamically using appropriate storage management software. For example, the location management database 407, in some embodiments, can be a database containing information regarding the beacons 401, 402, 403, their locations, online calendars associated to them, or any information for the client. The location management database 407 can be part of the analytical server 406, however, in some embodiments the location management database 407 may reside on a different computing device than the server (e.g., a distributed computing environment).

The location management system 400 may also include a network 405, which is any common communication architecture that facilitates communication between computing devices. For example, the computing devices communicating over the network 405 would be the receiving device 404, one or more beacons 401, 402, 403, the analytical server 406, and the location management database 407. One having ordinary skill in the art would appreciate that the network may be the Internet, a private intranet, or some hybrid of the two. The network 405 may be comprised of any combination of devices and protocols capable of facilitating communication between computing devices. Non-limiting examples of devices comprising the network 405 may include routers, switches, hubs, firewalls, proxy servers, telecommunications trunks, and the like. Non-limiting examples of protocols employed by the network may include TCP/IP, Wi-Fi, Bluetooth®, 3G, Wi-Max, and the like. Wireless communication between one or more receiving devices and one or more transmitters may be performed with a relatively short-range wireless communication protocol such as Wi-Fi, Bluetooth, high frequency systems, or other relatively localized wireless communication protocols. The network 405 may be any common communication architecture that facilitates communication between computing devices.

Beacons 401, 402, 403 may be any computing or other electronic device comprising a processor and a wireless interface capable of transmitting signals to a receiving device. The signals may contain binary data, and the binary data may represent various types of data and/or information for the receiving device 404 to consume and implement. The components of the receiving device 404 receiving the signals, may translate the signals into useful binary data triggering various tasks and process according to the application executed by the receiving device 404. The beacons 401, 402, 403 may implement any suitable components for wirelessly communicating with the receiving device 404, or other receivers. The technological components may include wireless networking hardware and the related protocols, such as a Bluetooth low energy (BLE) interface chip and the Bluetooth wireless communication protocols. An example of beacons 401, 402, and 403 may be transmitters 10 and 20 (described in FIG. 1) and may be any computing or other electronic device comprising a processor and a wireless interface capable of transmitting signals to a receiving device. The transmitters 10 and 20 may implement any suitable components for wirelessly communicating with the receiving device 404, or other transmitters. The technological components may include wireless networking hardware and the related protocols, such as a Bluetooth low energy (BLE) interface chip and the Bluetooth wireless communication protocols.

In some embodiments, UUIDs may be random or pseudo-random data strings (numbers or characters) associated with a device (e.g., receiving device) or device component (e.g., Bluetooth interface, wireless network interface). A UUID may be as complex as a number represented by 128-bits, and have a structure and construction determined by the protocol utilizing the UUID (e.g., 802.11, Bluetooth, NFC), and in some cases, the variant or version of the protocol. It should be appreciated that any suitable implementation and version of UUIDs may be employed to identify devices in the system (e.g., location management database 407). Non-limiting examples of techniques for generating a device's UUID may include a time-based version with unique or random host identifier, a DCE Security version (with POSIX UIDs), a name-based version using an MD5 hash, a random or pseudo-random UUID version, and a name-based version using a SHA-1 hash. For example, in certain embodiments, the UUID comprises the MAC address of the computer that is generating the UUID, and a time stamp associated with the moment the UUID is generated, which could be the number of 100-nanosecond intervals that have passed since midnight.

In certain embodiments, the data strings from the beacon can consist of two other identifiers—a major field and a minor field. The major field is a short data string used to distinguish a smaller subset of beacons within the larger group. The minor field is a shorter data string that may be used to distinguish an even narrower subset within that smaller subset of beacons. For example, the minor field can be used to identify individual beacons. Alternatively, the major and minor fields can together be viewed as comprising a single flat (non-hierarchical) space wherein individual beacons can be identified. In certain embodiments of the invention, the beacon can consist of information regarding transmission power, which is used to determine proximity (distance) from the beacon. The data strings from the beacon can comprise both constant identifiers that do not change with every broadcast and dynamic identifiers that change with every broadcast.

In certain embodiments of the invention, the beacon transmits repeated broadcasts of data strings. The timing of the broadcasts and the construction of the data strings can vary arbitrarily. The iBeacon device may broadcast the same data string repeatedly, i.e., continuous broadcasting of the data string with the actual identifiers of the beacon. In certain embodiments, the beacon is modified such that the broadcasting of the data string with the actual identifiers is interspersed by broadcasting of data strings that contain varying identifiers. The timing of the broadcasts and the construction of the identifiers in the data strings can be according to a predetermined pattern. The timing of the broadcasts and the construction of the identifiers in the data strings can therefore be retrieved from a database or computed on demand as needed. The timing of the broadcasts and the construction of the identifiers in the data strings can be devised in any combination of the foregoing. In certain embodiments, the data string with the actual identifiers has a specific combination of characters. For example, the data string with the actual identifiers has a specific combination of UUID, a major field, and a minor field. The beacon transmits this data string with the actual identifiers along with subsequent transmissions of data strings where the UUID is constant but the major field or the minor field or both fields change. The periodicity of transmission of the data string with the actual identifiers during the broadcast of the data strings that contain varying identifiers from the beacon can vary arbitrarily. The periodicity of transmission of the data string with the actual identifiers during the broadcast of the data strings that contain varying identifiers from the beacon can be according to a predetermined pattern. Embodiments can include a cloud-based wireless registry and location management system, and at least two other devices—a beacon which transmits one or more data strings and a receiving device that receives the transmitted information from the beacon. The beacon transmits the data strings in a certain characteristic pattern. In certain embodiments, the beacon transmits a data string, which is associated with a key that is shared with the cloud infrastructure. The keys can be shared over a secure channel before the transmission of the beacon. The key can be used to manage data integrity and authentication of message. In certain embodiments, the key can determine the periodicity of transmission of the data string with the actual identifiers during the broadcast of the data strings that contain varying identifiers from the beacon. In certain embodiments, this pre-shared key is known by both the wireless registry and the beacon. The beacon broadcasts at least one data string with the actual identifiers and one data string with varying identifiers. In certain embodiments, the data strings with varying identifiers include changing the major field or the minor field or both fields over time. The data strings with changing major field or minor field or both over time can be the result of pseudo random sequence generators. Certain embodiments include data strings with varying identifiers constructed using cryptographic hash functions that take data input and generate a hash function. The hashing functions can be constructed using a variety of algorithms, for example a keyed-hash message authentication code (HMAC), either MD5, SHA1 or SHA256 or such. Certain embodiments utilize a pre-shared key combined with a time component. The time component can be a synchronized function, wherein a known output is provided at a given point in time. This synchronized time function is known to both the beacon and the cloud-based database.

In certain instances, the beacon can broadcast data strings that include changing minor fields, and this can be part of the authentication process. In certain instances of beacon authentication, the beacon transmits a data string with the actual identifiers every other time or every first, third, fifth, and every odd transmission. For example, during every even instance of transmission of data strings, the beacon transmits a data string with the actual identifiers. In the next odd instance of the transmission, the beacon transmits a data string with varying identifiers, such as a data string containing a static UUID and major field identifiers, along with a dynamic identifier—the minor field that changes with time. The dynamic identifiers can change in a pseudo random manner that is a function of time and the pre-shared key. In the next even instance of the transmission, the beacon transmits a data string with the actual identifiers, and then in the next transmission, the beacon will contain the original UUID and the major field but now with a different minor field. And thus, this beacon will be associated with a characteristic pattern of transmitted data strings.

In certain instances, the beacon can broadcast data strings that include changing major and minor fields, and these fields can be part of the authentication process. For example, during every fifth instance of transmission of data strings, the beacon transmits a data string with the actual identifiers. In the other four instances of the transmission, the beacon transmits a data string with varying identifiers, such as a data string containing a static UUID identifiers, along with along with the dynamic identifiers—the major field or the minor field or possibly both—that change with time. And thus, this beacon will have a different characteristic pattern based on at least the frequency of appearance of the data string with the actual identifiers, and the changes in the dynamic identifiers of the other data strings. In addition to using unique identifiers from beacons or transmitters 10 and 20, the analytical server can also triangulate using other signals, such as WiFi signals. The analytical server can use WiFi and RSSI similar to how was described above using RSSI with BLE. Other signals that can be used to identify location include CDMA, LTE, and WiMax.

Certain embodiments include a receiving device that receives the beacon broadcasts from the beacon and recognizes the pattern of beacon broadcasts, including the static and dynamic identifiers. And once this receiving device has collected a sufficient history of the beacon broadcasts, the information is sent to the cloud-based wireless registry and the location management system. Based on the pre-shared key associated with the static identifier, the analytical server determines the expected pattern of beacon broadcasts for the dynamic identifiers. The analytical server then compares the received broadcasts from the receiving device to those which itself determined. The degree of that verification, whether the beacon message is appropriately suited for the beacon or not, is sent back to the receiving device. Certain embodiments may require that the receiving device have access to a particular application to interact with the cloud-based wireless registry and location management system.

In certain embodiments, the beacons 401, 402, 403 may transmit the data strings in their characteristic pattern. A nearby receiving device receives these data strings and once a sufficient number of data strings have been collected, the receiving device communicates with the network server regarding the data strings. When the network server receives the information from the receiving device, the server processes the information to verify the authenticity of the information received by the receiving device or the integrity of the information received by the receiving device or both. Once verified, the receiving device receives knowledge of said verification. If the verification process fails, the network server can be designed to notify an administrator that flags the beacon or the transmission for the beacon. In certain embodiments, other security processes can be initiated to deal with the failure in the verification of the information.

In one embodiment a network server can receive information from a receiving device containing a collection of data strings received from the beacon. The server can connect to the one or more receiving devices through a public network such as the Internet, a local area network, a wide area network, a private network, telephone network, cable network, broadband network, Ethernet network, digital subscriber line (DSL) network, or any other network that enables servers and receiving devices to interact with one another. The server can include one or more processors, wireless receivers, displays, and one or more memory mediums.

Although FIG. 4 shows only a limited number of beacons 401, 402, 403, it should be appreciated that more transmitters may be communicatively coupled to one another, over a wired and/or wireless network of transmitters. That is, locations, such as brick-and-mortar office buildings, schools, campuses of multiple buildings, governmental or administrative buildings, and the like, may implement localized networks of beacons to transmit and/or collect data, across a broader area. Furthermore, although the exemplary system described in FIG. 4 describes stationary beacons 401, 402, 403, it should also be appreciated that beacons 401, 402, 403 may be any suitable stationary or mobile devices that are capable of performing the various tasks and processes described herein. Thus, a collection of beacons 401, 402, 403 can comprise a combination of mobile and stationary devices. It should also be appreciated that, although FIG. 4 describes beacons 401, 402, 403 performing one-way signal transmissions, beacons 401, 402, 403 may be capable of two-way communications (e.g., collecting data from signals transmitted by receiving devices), and may be capable of a number of functions or execute a variety of software modules. Non-limiting examples of beacons 401, 402, 403 may include an iBeacon, AltBeacon, and EddyStone, a wireless router, a cellular phone, a tablet, a wearable, a workstation, or any other suitable computing or other electronic device. The data strings from the beacon can comprise both constant identifiers that do not change with every broadcast and dynamic identifiers that change with every broadcast.

Additionally, the analytical server could work in cooperation with third-party tracking software to provide alternative means for tracking. For instance, a system for tracking within a building could be private, but work in cooperation with a third party application, such as Facebook® to continue to track a user after they leave a building. The system could either hand-off tracking to Facebook®, such that users must use that application to track people, or the system could use an application programming interface (API) to retrieve users' locations from Facebook and display Facebook's information in a different application.

Figure 3:
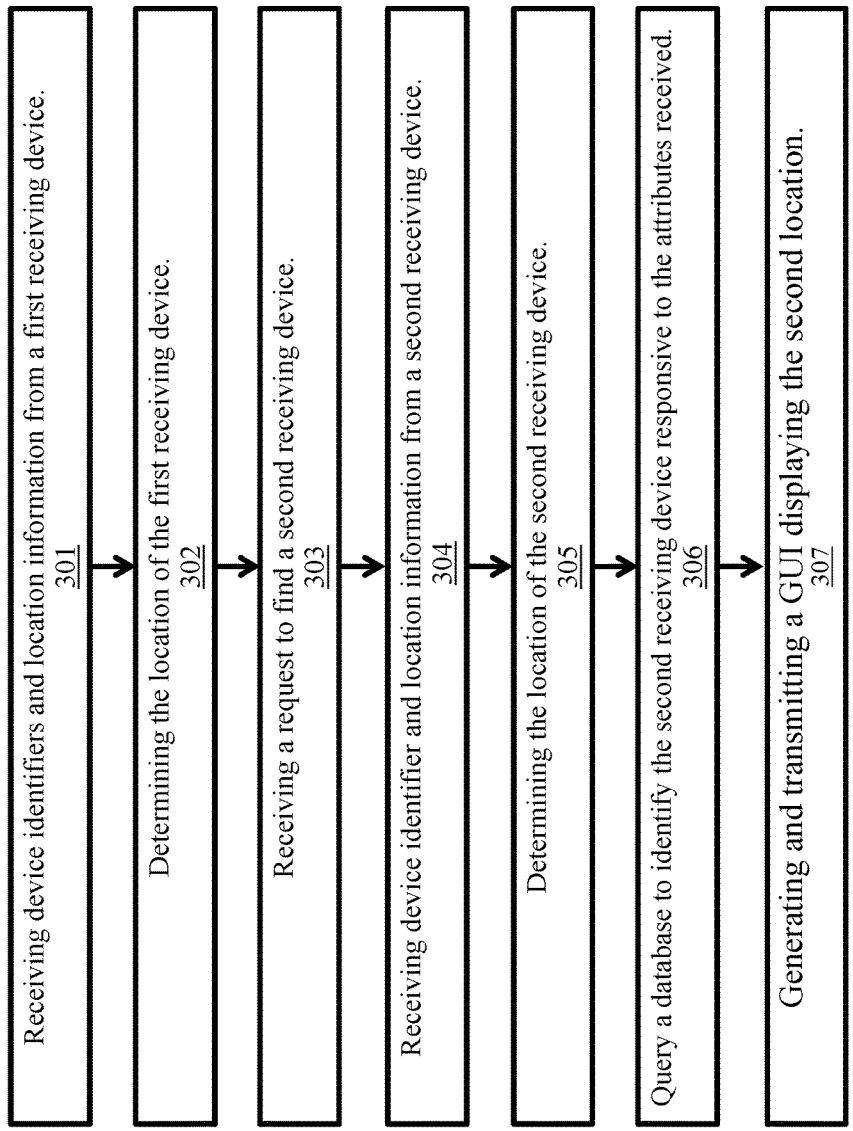
FIG. 3 illustrates a operational steps of a method for identifying an interested coworker, according to an embodiment

Referring now to FIG. 3, a flowchart depicting operational steps of a method for identification of other co-workers based on their beacon-based location and attributes is illustrated, in accordance with an embodiment. Steps of the method 300 may be implemented using one or more modules of the analytical server, the beacon transmitters, and receiving devices (described in FIG. 4). FIG. 3 does not imply any limitations with regard to the environments or embodiments that may be implemented. Modifications to the depicted environment in FIG. 3 may be made.

At step 301, the analytical server may receive a first set of data (comprising a device identifier) from a first receiving device (e.g., a mobile device or any other electronic device configured to receive data or communicate with a wireless transmitter device such as a beacon). The first set of data may include a device identifier (e.g., a UUID as explained above) accompanied by data packets received from one or more beacons. The first set of data may be associated with a receiving device within a predefined area from the beacon (e.g., a predetermine area, which the beacon is configured to transmit wireless identifiers). The receiving device, within the predefined area, may receive an identifier from a beacon and communicate back with the beacon in order to establish a connection. In some embodiments, the analytical server may generate an instruction to query a database (not shown) and inquire more information about the receiving device. For example, a database may contain information regarding the first user's (the user associated with the first mobile device) preferences (e.g., attributes of a coworker whom the user desired to meet), calendar information, or other information associated with the office location of the user or the user's colleagues. The analytical server may use this information to generate or update a profile for the user or access a pre-generated profile associated with the first user.

At step 302, the analytical server may determine a location associated with the receiving device using any of the above-mentioned methods. The analytical server may associate the unique identifier received from the beacon transmitter with location information. The analytical server may retrieve a map from a database associated with the receiving device or the identified location (e.g., location management database as explained in FIG. 4) and identify the location based on the transmitted identifier. The analytical server may also gage the strength of the transmission from each beacon transmitter (e.g., RSSI) in order to locate the receiving device. In some embodiments, the analytical server may generate an instruction configured to query a database for a floor plan associated with the location of the receiving device or a user associated with the receiving device. For example, the analytical server may determine an office location for a user associated with the receiving device, and generate an instruction configured to receive the floor plan for said office location. In some embodiments, the analytical server may query for different landmarks and different points of interest from the database. For example, if the analytical server determines that the receiving device is located on the third floor of building A, the analytical server may query a database, which contain floor map (and other data) associated with the third floor of building A and determine the location of user's (user associated with the receiving device) office location, user's colleagues office location, water fountain, restrooms, meeting/conference rooms, and the like.

At step 303, the analytical server may receive a request to find a second receiving device, wherein the request comprises a set of attributes associated with the second receiving device. The analytical server may receive the request from the first receiving device. In some embodiments, the first receiving device (or another electronic device) may seek to meet a specific receiving device. For example, the first receiving device (associated with employee A) may be looking for employee B (associated with the second receiving device). In those embodiments, the first receiving device may transmit a request to the analytical server and identify employee B. If the request does not include a unique identifier for employee B, the analytical server may query a database configured to keep records of all unique identifiers, and identify which receiving device is associated with employee B. In some embodiments, the employee associated with the first receiving device may just be looking for a receiving device, which matches certain attributes. For example an employee may be looking for any other employee with a chemical engineering degree. The analytical server may receive these attributes directly from the receiving device. Alternatively, the analytical server may identify the employee associated with the first receiving device and query a database for a user profile associated with the employee. The user profile may be pre-filled with all the attributes for a matching co-worker (e.g., employee associated with the first receiving device may have previously generated a profile and inputted all the attributes associated with an ideal co-worker match).

At step 304 and 305, the analytical server may receive a second set of data from the second receiving device. The second set of data may, similar to the first set of data, contain device identifier (e.g., a UUID as explained above) accompanied by data packets received from one or more beacons. The analytical server may (using the same method as stated above) determine a location for the second receiving device.

At step 306, the analytical server may query a database to identify the second receiving device responsive to the attributes received from the first receiving device (or the profile associated with the first receiving device), wherein the database is configured to store one or more records of the plurality of attributes associated with one or more records of a plurality of receiving devices, wherein time of arrival associated with the second receiving device at the location associated with the second receiving device is responsive to pre-determined threshold. The analytical server may identify different employees (associated with other receiving devices) based on their attributes and whether the attributes match the criteria received from the first receiving device. In an example, an employee with an interest in politics may be matched with the first receiving device because the first receiving device has indicated politics is an attribute for which the first receiving device (e.g., the employee associated with the first receiving device) is searching. In some embodiments, the analytical server can find a match if one criteria matches, and in other embodiments the analytical server can require that more than one criteria matches to find a sufficient match.

The analytical server may limit the search to receiving devices associated with users within a pre-determined area. For example, if the user associated with the first receiving device is located in a cafeteria, the analytical server may only search for other employees within the cafeteria (or a pre-determined threshold distance away from the cafeteria). The analytical server may receive the pre-determined area from the first receiving device. For example, the employee associated with the first receiving device may use a user interface associated with the analytical server (e.g., displayed on the first receiving device) and input/designate a building (e.g., search for employees within the cafeteria) or a pre-determined area (e.g., search for employees within a 200 ft. radius of my current location).

The analytical server may use a time factor when matching users. A user will be matched with another user when both users are located within a pre-determined area and for a pre-determined time. For example, the analytical server may not match two receiving devices (even if the other attributes and criteria are satisfied) if one of the users is leaving the event or the pre-determined area. The analytical server may determine a time value associated with the second receiving device, wherein the time value corresponds to the time that the second receiving device will remain in the location associated with the second receiving device. In an embodiment, the analytical server may determine the time of arrival for the second user and determine an estimated time that the user is staying at the pre-determined area. When matching users, the analytical server can make determinations about how long a person will remain in the pre-determined area (e.g., cafeteria) based on predefined criteria (e.g., the user has inputted that he will remain in the cafeteria for 30 minutes) or on past behavior. For example, the analytical server may determine that a user will remain in the cafeteria for 30 minutes after arrival. For example, if a user is waiting in line at a cafeteria for food (e.g., the analytical server determines that the location associated with the second receiving device is consistent with the food lines in the cafeteria), he will likely be in the cafeteria longer than a person who just checked out at a cash register. Accordingly, the analytical server can determine that a person waiting in line for food will be available to be matched for a predetermined time period (e.g., 50 minutes or any other pre-determined time received by the user or identified based on user's past behavior) while a person who just checked out would be available for less time (e.g., 30 minutes or any other pre-determined time received by the user or identified based on user's past behavior). Similarly, if a person typically spends 30 minutes in the cafeteria (e.g., past behavior), the analytical server can assume that they will only be available for that amount of time. The analytical server can associate an expected amount of time that a user will spend in the cafeteria based on a predefined number of samples of how much time they spent in the cafeteria. The analytical server may match the first receiving device with a second user device if the time value associated with the second receiving device satisfies a threshold. The threshold may be pre-determined or may be received from the first or the second receiving devices. For example, the user associated with the first receiving device may indicate a desire to be matched with other users who will remain in the cafeteria for at least 30 minutes.

At 307, the analytical server may generate a graphical user interface comprising instructions (e.g., directions) to reach the second receiving device and transmit the graphical user interface to the first receiving device. In an alternative embodiment, the analytical server may generate data to be presented on a graphical user interface, such as content to be presented when the graphical user interface is displayed on the first receiving device or upon rendering a web page on a web browser. The analytical server may then transmit this data to the first receiving device for display accordingly. In other embodiments, the instructions may be transmitted using audio or haptic instructions to be transmitted to the first receiving device.

The analytical server may also track the location of the first receiving device and generate and transmit a notification, which notifies the second receiving device that the second receiving device has been matched with the first receiving device. In some embodiments, the notification may also comprise a location associated with the first receiving device and/or a profile associated with the first receiving device. For example, the analytical server may generate a notification (e.g., updating the graphical user interface on the second receiving device, texting, or emailing the second employee associated with the second receiving device) that he has been matched with the first employee (associated with the first receiving device) because they are both interested in politics. The second employee operating the second receiving device may decline the match after reviewing the profile associated with the first receiving device and the analytical server may generate a notification indication the second receiving device's refusal to the first receiving device. The analytical server may also allow people who are matched to contact each other via voice, text, or video to discuss how to find each other.

The analytical server can also work in cooperation with a system providing location information to confirm that a user is at least nearby the location. In these embodiments, the analytical server can determine whether the user has returned to their desk and then automatically generate a notification to both receiving devices that the meeting is cancelled. Similarly, the receiving device can receive location information from sources other than terrestrial transmitters that transmit a few meters. Location information can be gathered from GPS, WiFi, or other applications on the receiving device. For instance, the receiving device may have an API for retrieving the receiving device's location. In either case, when the user reaches a predefined location, such as their home or office, the analytical server can require input to an automatically generated report or checklist.

In some embodiments, the analytical server may automatically start querying the database (in order to identify the second receiving device) once the first receiving device is identified within a pre-determined area. For example, the analytical server may determine that the first receiving device is located in a cafeteria (or a pre-determined threshold away from the cafeteria) and automatically start looking for a coworker. In some embodiments, the analytical server may query a calendar associated with the first receiving device and determine a special event (e.g., a happy hour or other social events) and upon the first user arriving at the event, automatically find a coworker and notify the first and the second receiving devices. The analytical server may receive a designation for the pre-determined area or the event from the first receiving device. In a non-limiting example, an employee operating the first receiving device may send a request to the analytical server to find a match when the employee attends the employee appreciation happy hour event located in the amphitheater. Upon the employee entering the amphitheater, a receiving device associated with the employee may receive beacon transmissions and the analytical server may detect that the employee's location. The analytical server may then automatically find a like-mined coworker (based on attributes designated by the employee in the employee's profile) and send the coworker's location to the employee's receiving device.

Embodiments present several advantages over existing systems. The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," and "etc.," are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. The invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein. While various aspects and embodiments have been disclosed, other aspects and embodiments are contemplated. The various aspects and embodiments disclosed are for purposes of illustration and are not intended to be limiting, with the true scope and spirit being indicated by the following claims.

What is claim is:

1. A method comprising:
   receiving, by a server, from a plurality of receiving devices, a plurality of device identifiers and a plurality of location information, wherein the plurality of location information is received by each receiving device within the plurality of receiving devices from one or more beacons, and wherein the plurality of location information identifies a location of each receiving device within the plurality of receiving devices;
   detecting, by the server, a location of a first receiving device of the plurality of receiving devices, based on the location information received from the first receiving device, the location information received from the first receiving device corresponding to a unique identifier of at least one beacon, wherein the server identifies the location of the first receiving device based on the unique identifier of the at least one beacon;
   upon the detected location of the first receiving device being within a pre-determined area, querying, by the server, a database to retrieve a user profile comprising a set of user preference attributes associated with a user operating the first receiving device;
   querying, by the server, the database to identify a second receiving device within the plurality of receiving devices, the second receiving device being responsive to the set of user preference attributes, wherein the second receiving device is located within a pre-determined proximity to the first receiving device; and
   generating and transmitting, by the server, a notification to the first receiving device, the notification comprising the identifier and the location of the second receiving device.

2. The method of claim 1, further comprising:
   determining, by the server, a path associated with the first receiving device, wherein the path corresponds to the location of the first receiving device in relation to the location of the second receiving device; and
   transmitting, by the server, the path for display on the first receiving device.

3. The method of claim 1, further comprising:
   determining, by the server, a time value associated with the second receiving device,
      wherein the time value corresponds to the time that the second receiving device will remain at the location of the second receiving device,
      wherein the time value associated with the second receiving device satisfies a threshold.

4. The method of claim 1, wherein the pre-determined proximity to the first receiving device is a threshold inputted by the user operating the first receiving device.

5. The method of claim 1, wherein the database is configured to store one or more records of user profiles comprising one or more attributes of a user operating each receiving device and a set of user preference attributes.

6. The method of claim 1, wherein the pre-determined area is received, by the server, from the first receiving device.

7. The method of claim 1, further comprising:
   generating, by the server, a notification identifying the first receiving device; and
   transmitting, by the server, the notification to the second receiving devices.

8. The method of claim 7, wherein the notification comprises a display of the location of the first receiving device.

9. The method of claim 7, wherein the notification comprises an option for the second receiving device to decline the transmission of the location of the second receiving device to the first receiving device.

10. The method of claim 1, wherein the set of user preference attributes are received, by the server, from the first receiving device and stored in the database within a profile associated with the first receiving device.

11. A computer system comprising:
    a server configured to:
    receive from a plurality of receiving devices, a plurality of device identifiers and a plurality of location information, wherein the plurality of location information is received by each receiving device within the plurality of receiving devices from one or more beacons, the plurality of location information identifying a location of each receiving device within the plurality of receiving devices;
    detect a location of a first receiving device of the plurality of receiving devices, based on the location information received from the first receiving device, the location information received from the first receiving device corresponding to a unique identifier of at least one beacon, wherein the server identifies the location of the first receiving device based on the unique identifier of the at least one beacon;
    upon the detected location of the first receiving device being within a pre-determined area, query a database to retrieve a user profile comprising a set of user preference attributes associated with a user operating the first receiving device;
    query the database to identify a second receiving device within the plurality of receiving devices, the second receiving device being responsive to the set of user preference attributes, wherein the second receiving device is located within a pre-determined proximity to the first receiving device; and
    generate and transmit a notification to the first receiving device, the notification comprising the identifier and the location of the second receiving device.

12. The computer system of claim 11, wherein the server is further configured to:
    determine a path associated with the first receiving device, wherein the path corresponds to the location of the first receiving device in relation to the location of the second receiving device; and
    transmit the path for display on the first receiving device.

13. The computer system of claim 11, wherein the server is further configured to:
    determine a time value associated with the second receiving device,
        wherein the time value corresponds to the time that the second receiving device will remain at the location of the second receiving device,
        wherein the time value associated with the second receiving device satisfies a threshold.

14. The computer system of claim 11, wherein the predetermined proximity to the first receiving device is a threshold inputted by the user operating the first receiving device.

15. The computer system of claim 11, wherein the database is configured to store one or more records of user profiles comprising one or more attributes of a user operating each receiving device and a set of user preference attributes.

16. The computer system of claim 14, wherein the predetermined area is received, by the server, from the first receiving device.

17. The computer system of claim 11, wherein the server is further configured to:
    generate a notification identifying the first receiving device; and
    transmit the notification to the second receiving devices.

18. The computer system of claim 17, wherein the notification comprises a display of the location of the first receiving device.

19. The computer system of claim 17, wherein the notification comprises an option for the second receiving device to decline the transmission of the location of the second receiving device to the first receiving device.

20. The computer system of claim 11, wherein the set of user preference attributes are received, by the server, from the first receiving device and stored in the database within a profile associated with the first receiving device.

* * * * *